United States Patent [19]

Tiberio et al.

[11] Patent Number: 4,477,478
[45] Date of Patent: Oct. 16, 1984

[54] ACID PRESERVATION SYSTEMS FOR FOOD PRODUCTS

[75] Inventors: Jeanne E. Tiberio, Lodi; Michael C. Cirigliano, Tenafly, both of N.J.

[73] Assignee: Thomas J. Lipton, Inc., Englewood Cliffs, N.J.

[21] Appl. No.: 389,978

[22] Filed: Jun. 18, 1982

[51] Int. Cl.³ .......................... A23D 5/00; A23L 1/24; A23L 3/34
[52] U.S. Cl. .................. 426/330.6; 426/532; 426/602; 426/605; 426/613
[58] Field of Search ............... 426/330.6, 532, 602, 426/605, 613, 335

[56] References Cited

U.S. PATENT DOCUMENTS

| | | |
|---|---|---|
| 1,311,709 | 7/1919 | Plaisance . |
| 1,686,393 | 10/1928 | Oshima . |
| 1,889,123 | 11/1932 | Jones . |
| 2,417,806 | 3/1947 | Bauer et al. . |
| 2,593,223 | 4/1952 | Trelease et al. . |
| 2,622,031 | 12/1952 | Brandsen . |
| 2,622,032 | 12/1952 | Brandsen . |
| 2,910,368 | 10/1959 | Melnick et al. ................. 426/605 X |
| 3,328,178 | 6/1967 | Alderton . |
| 3,351,471 | 11/1967 | Demler et al. . |
| 3,503,753 | 3/1970 | Dable . |
| 3,505,082 | 4/1970 | Miller . |
| 3,542,565 | 11/1970 | Stauffer ............................. 426/605 |
| 3,692,534 | 9/1972 | Ueno et al. . |
| 3,716,374 | 2/1973 | Pitchon . |
| 4,011,346 | 3/1977 | Ernst ............................... 426/532 X |
| 4,076,850 | 2/1978 | Nickerson et al. . |
| 4,140,808 | 2/1979 | Jonson ........................... 426/613 X |
| 4,145,451 | 3/1979 | Oles ................................ 426/613 X |
| 4,158,706 | 6/1979 | Ernst et al. . |
| 4,241,095 | 12/1980 | Shibata et al. . |
| 4,352,832 | 10/1982 | Wood et al. ................... 426/613 X |
| 4,387,109 | 6/1983 | Kahn et al. .................. 426/330.6 X |

FOREIGN PATENT DOCUMENTS

495495  9/1977  Australia ............................ 426/605

OTHER PUBLICATIONS

Stamer, J. R., The Lactic Acid Bacteria Microbes of Diversity, Food Technology, Jan: 60–65, 1979.
Spiegel, L. S., Acids in Pet Foods, Petfood Industry, Sep./Oct., pp. 26–28, 1979.
Barr, J. G. Effects of Volatile Bacterial Metabolites on the Growth Sporulation, and Mycotoxin Production of Fungi, J. Sci. Food Agric. 27 (4): 324–330, 1976.

Primary Examiner—Robert Yoncoskie
Attorney, Agent, or Firm—Brumbaugh, Graves, Donohue & Raymond

[57] ABSTRACT

Fumaric acid is used in combination with critical amounts of acetic acid to preserve acid containing food products from microbiological spoilage in the absence of or at reduced levels of chemical preservative.

17 Claims, No Drawings

ACID PRESERVATION SYSTEMS FOR FOOD PRODUCTS

This invention relates to a method of preserving food products against microbiological spoilage and to the preserved food products obtained thereby.

BACKGROUND OF THE INVENTION

Growing popularity of health foods and natural foods has greatly increased the need for a method of preventing food spoilage without use of the chemical food preservatives which are usually used. Even when used, it is desired to employ chemical food preservatives at reduced levels. Additionally, certain organoleptic properties which are desirable in some foods are only obtainable in the absence of chemical preservatives or when the quantity of chemical preservatives is substantially reduced.

Most common food spoilage problems are caused by unwanted growth of bacteria, yeasts and molds. In those foods wherein acid is present, the pH is generally sufficiently low that growth of bacteria which are harmful to man or animals is inhibited. Certain bacteria, molds and yeasts, however, may grow under these pH conditions to cause spoilage.

A recent attempt to solve this problem in low acid foods has been described in U.S. Pat. No. 4,145,451 to Oles, wherein microbiological spoilage is prevented by use of phosphoric acid in synergistic combination with acetic acid, and in the absence of the usual chemical food preservatives. The prior art usage of sugar and organic acids for the preservation of food products including salad dressings, mayonnaise, and condiments as well as reference to the well-known relationship between the requirements for sugar and acid as used in the preservation of foods is also discussed in the Oles patent.

SUMMARY OF THE INVENTION

In accordance with the present invention, storage stable acid containing food products may be prepared by adding thereto for preservation purposes fumaric acid or fumaric acid in combination with acetic acid at a level sufficient to prevent spoilage.

Food products including salad dressings and mayonnaise containing acid may thus be produced wherein microbiological spoilage is prevented without the use of chemical preservatives. In one preferred embodiment a salad dressing is produced comprising edible oil, sweetener, salt, emulsifier, water, nonfat dry milk solids, starch, gum, spices and flavors, acetic acid and fumaric acid. In another preferred embodiment a salad dressing is produced comprising edible oil, water, acetic acid and fumaric acid.

Thus, in accordance with the present invention, a method is provided for preparing low acid food products which are stable against spoilage without the presence of chemical preservatives or with reduced levels of chemical preservatives.

An advantage of the present invention is that the need for chemical preservatives can be eliminated and preservation of acid containing food products can be achieved without increasing the total titratable acid content of the food product.

Another advantage of the present invention is that food products having reduced levels of acetic acid are provided at given sugar contents which are preserved against spoilage without the use of chemical perservatives.

An additional advantage of the present invention is that food products are produced which have a lower level of perceived tartness and which thus may be more organoleptically desirable.

DESCRIPTION OF INVENTION

The food compositions of the present invention comprise between 0 and about 60 percent by weight edible oil, between about 20 and about 96 percent by weight moisture, between about 0 and about 30 percent by weight sweetener, and the balance is food solids and a preserving system containing fumaric acid alone or in combination with acetic acid. The food compositions contain about 0 percent to 1.8 percent acetic acid and about 0.1 percent to 1.5 percent fumaric acid, the percent acetic and fumaric acids being expressed as weight percent based on total moisture present. All other percents are calculated as weight percent of the total composition.

Generally, consistent with producing a palatable food composition acetic acid is added until the desired level of tartness is attained and then fumaric acid is added until effective preservation is achieved. The relative amounts of acetic and fumaric acid added to the product are chosen to provide effective preservation of the food product against microbiological spoilage in the absence of chemical preservatives. Alternatively, the relative amounts of acid are chosen to allow the amount of chemical preservative needed to prevent microbiological spoilage to be reduced.

Microbiological spoilage, as used herein, is that spoilage caused by growth of yeast, mold and/or bacteria, including lactobacilli. Effective Preservation, as used herein, is die off of lactobacilli, yeast and/or mold at both high and low contamination levels in four weeks. Die off for high level inoculations is at least a 3 log drop in contaminants. Die off for low level inoculations is at least a 1 log drop in contaminants.

In those food products wherein acetic acid is not normally an ingredient or is not required for flavor, fumaric acid may be used with or without acetic acid as a preservative to prevent microbiological spoilage in the absence of chemical preservatives. Alternatively, the fumaric acid may be added in quantities sufficient to reduce the amount of chemical preservative required to prevent microbiological spoilage.

Optional ingredients used in producing the food products of this invention include, but are not limited to, egg yolk, buttermilk, buttermilk solids, dehydrated sour cream, nonfat dry milk solids, food particulates, such as bacon, cheese and minced onions, salt, gums, such as xanthan and algin derivatives, emulsifiers, starch, spices and flavors, ethylenediaminetetraacetic acid (hereinafter EDTA), and a low level of chemical preservatives, such as potassium sorbate and sodium benzoate.

The ingredients utilized in the food products of this invention are well known. Any of the well known triglyceride oils or mixtures thereof derived from oil seeds may be used, for example cottonseed, soybean, corn or safflower. Sweeteners including sucrose, dextrose, fructose and corn syrup solids may be used. Sucrose is the preferred sweetener. The level of use of sweetener is determined based on its sweetening power as compared with sucrose as the standard (hereinafter sucrose equivalent). Artifical sweeteners also may be used.

The acetic acid is typically incorporated in the formulations of this invention as vinegar of about 100 grain strength, i.e., about 10% acetic acid.

The source of egg yolk may be whole eggs or dry or liquid egg yolk and may be fresh or frozen. The egg yolk content is expressed in terms of egg yolk solid in the examples provided herein. The gums, starches, spices and flavors that are utilized in this invention are well known to those in the food industry and are conventionally employed for food uses. While a gum and a starch may be utilized together, generally if a starch is added the gum is omitted and vice versa. Moisture, as used herein, includes moisture in water, buttermilk and lactic acid.

The food products of this invention may be pourable or semisolid, emulsified or nonemulsified, they may contain oil or be oilless as that term is generally understood in food technology. The food products of this invention include, but are not limited to, salad dressings as that term is broadly understood, that is a salad dressing is any savory liquid or semisolid cooked or uncooked food which may be used as a dressing for salad. Salad dressing as used herein is understood to include but not be limited to: mayonnaise, two-phase Italian dressing, oil-free dressing, French dressing, cucumber dressing, Blue cheese dressing, creamy Italian dressing, sour cream and bacon dressing and imitations thereof, including those for which federal standards have and have not been adopted. Salad dressing as used herein is also understood to include that food product similar in appearance to mayonnaise but which is stiffened by an addition of a cooked starch paste. Sandwich spreads utilizing a mayonnaise or salad dressing base are also within the scope of the present invention.

In those food products which normally include acetic acid as an ingredient an improved effect is observed when the amount of acetic acid is reduced and fumaric acid is substituted therefor in an amount such that the total amount of titratable acid is the same as it would be if only acetic acid had been used.

The inventors have discovered that if the quantity of acetic acid is selected so that the desired degree of tartness is achieved, and then fumaric acid is added so that the total titratable acid available is equal to that amount available in the previously formulated food product containing only acetic acid, the need for chemical preservatives to prevent microbiological spoilage is eliminated. Alternatively, the amount of chemical preservative which is necessary to prevent spoilage is greatly reduced when fumaric acid is added but the total titratable acid is less than the amount of titratable acid present in the original formulation. Only small amounts of fumaric acid need be used alone or in combination with acetic acid. Generally, about 0.1 percent to about 1.5 percent fumaric acid based on total moisture is necessary. Any food grade fumaric acid is suitable.

Generally, consistent with the aim of producing a palatable food composition for the purpose intended, the food products of this invention may have any of the ingredients listed below at the indicated levels. All percents are based on weight percent of the total composition except that the percent fumaric acid and acetic acid are expressed as weight percent based on total moisture present.

| INGREDIENT | WEIGHT PERCENT |
| --- | --- |
| Oil | 0–60 |
| Moisture | 20–96 |
| Sweetener | 0–30 |
| Egg Yolk | 0–8 |
| Food particulates | 0–20 |
| Nonfat Milk Solids | 0–10 |
| Salt | 0–5 |
| Gums | 0–5 |
| Emulsifiers | 0–1 |
| Spices and Flavors | 0–10 |
| Starch | 0–20 |
| Acetic Acid | 0–1.8 |
| Fumaric Acid | 0.1–1.5 |

A typical high oil containing dressing for salad, which may be either semisolid or pourable, might have the following composition:

| INGREDIENT | WEIGHT PERCENT | |
| --- | --- | --- |
| | Range | Specific Example |
| Oil | 30–60 | 50.0 |
| Moisture | 20–50 | 32.97 |
| Sweetener | 0–20 | 8.0 |
| Egg Yolk | 0–8 | 2.0 |
| Food Particulates | 0–25 | 0 |
| Nonfat Milk Solids | 0–10 | 2 |
| Salt | 0–5 | 1.5 |
| Gums | 0–2 | 0.75 |
| Starch | 0–20 | 0 |
| Spices and Flavors | 0–5 | 2.0 |
| Acetic Acid | 0–1.8 | 1.1 |
| Fumaric Acid | 0.1–1.50 | 1.28 |

A typical low-oil containing dressing for salad, which may be either pourable or semisolid, might have the following composition:

| INGREDIENT | WEIGHT PERCENT | |
| --- | --- | --- |
| | Range | Specific Example |
| Oil | 1.5–20 | 15.0 |
| Moisture | 25–90 | 67.22 |
| Sweetener | 0–25 | 10.0 |
| Egg Yolk | 0–8 | 0.0 |
| Emulsifiers | 0–1 | 0.3 |
| Nonfat Milk Solids | 0–10 | 0.0 |
| Salt | 0–5 | 2.0 |
| Gums | 0–5 | 1.5 |
| Starch | 0–20 | 0.0 |
| Spices and Flavors | 0–10 | 2.5 |
| Food Particulates | 0–25 | 0.0 |
| Acetic Acid | 0–1.8 | 0.89 |
| Fumaric Acid | 0.1–1.5 | 1.31 |

A typical oilless dressing might have the following composition:

| INGREDIENT | WEIGHT PERCENT | |
| --- | --- | --- |
| | Range | Specific Example |
| Oil | ≦1.5 | .75 |
| Moisture | 50–96 | 73.02 |
| Sweetener | 0–30 | 15.0 |
| Food Particulates | 0–25 | 2.0 |
| Nonfat Milk Solids | 0–10 | 0.0 |
| Salt | 0–5 | 2.0 |
| Gums | 0–5 | 2.5 |
| Starch | 0–20 | 0.0 |
| Spices and Flavors | 0–10 | 3.0 |
| Acetic Acid | 0–1.8 | 0.96 |
| Fumaric Acid | 0.1–1.50 | 1.41 |

These formulations are presented by way of example only and other formulations for dressings for salads are well known in the art. Similarly, techniques for the manufacture of dressing products of the types described herein are well known and within the skill of the art.

EXAMPLES

The following procedure was used to produce the formulations illustrated by Examples 1-5 in TABLE I except that in Examples 4 and 5 fumaric acid was not added. All numbers in TABLE I represent weight percent of the total composition except that the percent fumaric and acetic acid are expressed as weight percent based on total moisture.

Spices and flavors were mixed together in an 80% vinegar and 20% water solution.

Fumaric acid was added to the water to form a main mix. The main mix was heated until the fumaric acid dissolved (approximately 60° C.).

The main mix was then cooled to approximately 30° C. and the following ingredients were added: vinegar, salt, sugar, hydrolyzed yeast, EDTA, nonfat dry milk solids, spices and flavors and dehyrated sour cream. The resultant mix was agitated at room temperature.

The emulsifier and gum were mixed with a quantity of oil sufficient to form a slurry which was then transferred to the main mix. The rest of the oil was then added to the main mix which was agitated until the oil was adequately dispersed. The product was then emulsified. Thereafter, the salad dressing was bottled. It was stored at refrigeration temperature, (approximately 4° C.) until microbiological testing was begun.

TABLE I

| INGREDIENT | EXAMPLE | | | | |
|---|---|---|---|---|---|
| | 1 | 2 | 3 | 4 | 5 |
| Soybean Oil | 31.9 | 31.9 | 31.9 | 31.9 | 31.9 |
| Moisture | 52.0 | 51.6 | 50.8 | 51.3 | 51.8 |
| Dehydrated Sour Cream | 1.9 | 1.9 | 1.9 | 1.9 | 1.9 |
| Nonfat Dry Milk Solids | 0.9 | 0.9 | 0.9 | 0.9 | 0.9 |
| Sugar | 5.7 | 5.7 | 5.7 | 5.7 | 5.7 |
| Salt | 2.9 | 2.9 | 2.9 | 2.9 | 2.9 |
| Hydrolyzed Yeast | 1.3 | 1.3 | 1.3 | 1.3 | 1.3 |
| Gum | 1.3 | 1.3 | 1.3 | 1.3 | 1.3 |
| Spices and Flavors | 1.0 | 1.0 | 1.0 | 1.0 | 1.0 |
| Emulsifier | 0.3 | 0.3 | 0.3 | 0.3 | 0.3 |
| EDTA | 0.009 | 0.009 | 0.009 | 0.009 | 0.009 |
| Acetic Acid | 0.96 | 0.97 | 0.98 | 2.9 | 1.91 |
| Fumaric Acid | 0.47 | 1.47 | 2.85 | 0.0 | 0.0 |

Resistance to spoilage was determined by inoculating duplicate samples of each salad dressing formulation with $10^1$ to $10^2$ (low level) and $10^4$ to $10^5$ (high level) mixed lactobacilli strains measured as number of organisms/ml of substance and by inoculating samples of each salad dressing formulation with $10^1$ to $10^2$ and $10^4$ to $10^5$ mixed yeast strains measured as number of organisms/ml of substance. Incubation was at 27° C. and standard microbiological procedures were used to make initial plate counts and plate counts after 4 weeks. Tests wherein spoilage occurred are indicated by the letter S in TABLE II. The weight percent of fumaric and acetic acid as shown in TABLE II is based on total moisture present.

Effective preservation, as used herein, means die off of contaminant at both high and low contamination levels in four weeks. Die off for high level inoculations is at least a 3 log drop in contaminants. Die off for low level inoculations is at least a 1 log drop in contaminants. Borderline preservation, as defined herein, means no increase in contaminant at either the high or low level of inoculation in four weeks. In those cases where growth occurred at either the high or low level, there was no effective preservation as that term has been defined herein.

The results of the microbiological testing on formulations shown in Examples 1-5 are summarized in TABLE II. The preservation system contained in the formulation of Example 2 demonstrated preservative effectiveness against both high and low lactobacilli growth and was borderline with respect to yeast growth. The preservation system contained in the formulation of Examples 1 and 3 demonstrated preservative effectiveness against both high and low level lactobacilli, but was not effective as a preservative against yeast growth.

The formulation illustrated by Example 4, which contained no fumaric acid, was ineffective as a preservative against yeast at both high and low inoculation levels and was borderline against lactobacilli growth. The formulation illustrated by Example 5, which contained no fumaric acid, was ineffective as a preservative against high and low level lactobacilli and also ineffective against high and low level yeast.

TABLE II

| Example Number | Fumaric Acid | Acetic Acid | pH | 4th week Yeast | | Effective Preservation Yeast | 4th week Lactobacilli | | Effective Preservation Lactobacilli |
|---|---|---|---|---|---|---|---|---|---|
| | | | | High | Low | | High | Low | |
| 1 | 0.47 | 0.96 | 3.40 | *S | *S | No | <10 | <10 | Yes |
| 2 | 1.41 | 0.97 | 3.50 | $1.4 \times 10^4$ | <10 | Borderline | <10 | <10 | Yes |
| 3 | 2.85 | 0.98 | 2.80 | *S | *S | No | <10 | <10 | Yes |
| 4 | 0.0 | 2.4 | 3.4 | $4 \times 10^5$ | $2.3 \times 10^3$ | No | $5.1 \times 10^4$ | <10 | Borderline |
| 5 | 0.0 | 1.91 | 3.8 | *S | *S | No | $1.1 \times 10^5$ | $3 \times 10^4$ | No |
| 6 | 0.32 | 1.31 | 3.5 | <10 | <10 | Yes | <10 | <10 | Yes |
| 7 | 0.32 | 1.31 | 3.5 | <10 | <10 | Yes | <10 | <10 | Yes |
| 8 | 0.47 | 1.42 | 3.25 | <10 | <10 | Yes | <10 | <10 | Yes |
| 9 | 0.32 | 1.25 | 3.4 | <10 | <10 | Yes | <10 | <10 | Yes |
| 10 | 0.0 | 1.95 | 3.6 | <10 | <10 | Yes | $1.9 \times 10^4$ | $3 \times 10^1$ | Borderline |

*S = Spoilage

Examples 6-9 are illustrative of salad dressings having reduced levels of chemical preservatives. The following procedure was used to produce the formulations illustrated by Examples 6-10 in TABLE III except that fumaric acid was not added in Example 10. All numbers used in TABLE III represent weight percent of the total composition except that the percent fumaric acid and acetic acid are expressed as weight percent based on total moisture present.

Spices and flavors were mixed together in an 80% vinegar and 20% water solution. Sodium benzoate and potassium sorbate were dissolved in water. Fumaric acid was added to water to form a main mix. The main mix was heated until the fumaric acid dissolved, (approximately 60° C.).

The main mix was then cooled and the following ingredients were added: vinegar, lactic acid, sodium benzoate, potassium sorbate, sucrose, salt, nonfat dry milk solids, buttermilk solids, buttermilk, dehydrated sour cream, and EDTA.

The emulsifier and gums were mixed with a portion of the soybean oil, sufficient to form a slurry which was added to the main mix with agitation. The rest of soybean oil was added and mixed until the oil was adequately dispersed. The salad dressing was bottled and stored at about 4° C. until microbiological testing was begun. The formulations of Examples 6-10 were inoculated and tested for microbiological spoilage in the same manner as Examples 1-5 above.

The results of the microbiological tests on formulations shown in Examples 6-10 are summarized in TABLE II. It has been observed that the preservation systems contained in the formulation of Examples 6-9 are effective preservatives against lactobacilli at high and low inoculation levels and against yeast at high and low inoculation levels. The formulation illustrated by Example 10, which contained no fumaric acid, was effective as a preservative against yeast but was borderline as a preservative against lactobacilli.

TABLE III

| INGREDIENT | EXAMPLE | | | | |
|---|---|---|---|---|---|
| | 6 | 7 | 8 | 9 | 10 |
| Soybean Oil | 46.9 | 38.8 | 50.0 | 39.2 | 49.9 |
| Moisture | 27.6 | 31.1 | 21.5 | 31.7 | 20.4 |
| Dehydrated Sour Cream | 10.3 | 15.4 | 14.8 | 15.2 | 15.2 |
| Buttermilk | 2.4 | 2.6 | 2.2 | 2.5 | 2.5 |
| Sucrose | 4.2 | 4.3 | 4.3 | 4.3 | 4.3 |
| Salt | 1.4 | 1.6 | 1.6 | 1.6 | 1.6 |
| Lactic Acid | 0.90 | 0.86 | 1.0 | 0.8 | 0.8 |
| Gum | 0.32 | 0.35 | 0.25 | 0.35 | 0.35 |
| Spices and Flavors | 0.09 | 0.1 | 0.37 | 0.29 | 0.25 |
| Food Particulates | 2.45 | 0.9 | 0.2 | 0.0 | 0.0 |
| Sodium Benzoate | 0.1 | 0.1 | 0.1 | 0.1 | 0.1 |
| Potassium Sorbate | 0.2 | 0.2 | 0.1 | 0.1 | 0.2 |
| Nonfat Dry Milk Solids | 2.0 | 2.0 | 2.0 | 2.0 | 2.5 |
| Emulsifier | 0.2 | 0.2 | 0.2 | 0.2 | 0.2 |
| EDTA | 0.007 | 0.007 | 0.007 | 0.007 | 0.007 |
| Acetic Acid | 0.93 | 1.31 | 1.42 | 1.25 | 1.95 |
| Fumaric Acid | 0.32 | 0.32 | 0.47 | 0.32 | 0.0 |

While there have been described what are believed to be the preferred embodiments of the present invention, those skilled in the art will recognize that other and further modifications may be made thereto without departing from the spirit of the invention and it is intended to claim all such changes as fall within the true scope of the invention.

What is claimed is:

1. A salad dressing comprising between about 30 and about 60 percent by weight edible oil, between about 20 and about 50 percent by weight moisture, between about 0.89 and about 1.8 percent by weight acetic acid, based on total moisture content of the food composition, at least one salad dressing ingredient selected from the group consisting of egg yolk, buttermilk, buttermilk solids, dehydrated sour cream, nonfat dry milk solids, food particulates, salt, gums, emulsifiers, starch, spices and flavors, ethylenediaminetetraacetic acid, and a low level of chemical preservatives, and mixtures thereof and between about 0.1 and about 1.5 percent by weight fumaric acid, based on total moisture content of the food composition, the combined amounts of fumaric acid and acetic acid being effective to preserve the salad dressing against microbiological spoilage.

2. A salad dressing according to claim 1, further comprising a chemical preservative.

3. A salad dressing comprising between about 1.5 and about 30 percent by weight edible oil, between about 25 and about 90 percent by weight moisture, between about 0.89 and 1.8 percent by weight acetic acid, based on total moisture content of the food composition, at least one salad dressing ingredient selected from the group consisting of egg yolk, buttermilk, buttermilk solids, dehydrated sour cream, nonfat dry milk solids, food particulates, salt, gums, emulsifiers, starch, spices and flavors, ethylenediaminetetraacetic acid, and a low level of chemical preservatives, and mixtures thereof between about 0.1 and about 1.5 percent by weight fumaric acid, based on total moisture content of the food composition, the combined amounts of fumaric acid and acetic acid being effective to preserve the salad dressing against microbiological spoilage.

4. A salad dressing according to claim 3 further comprising a chemical preservative.

5. A salad dressing comprising less than about 1.5 percent by weight edible oil, between about 50 and about 96 percent by weight moisture, between about 0.89 and 1.8 percent by weight acetic acid, based on total moisture content of the food composition, at least one salad dressing ingredient selected from the group consisting of egg yolk, buttermilk, buttermilk solids, dehydrated sour cream, nonfat dry milk solids, food particulates, salt, gums, emulsifiers, starch, spices and flavors, ethylenediaminetetraacetic acid, and a low level of chemical preservatives, and mixtures thereof and between 0.1 and 1.5 percent by weight fumaric acid, based on the total moisture content of the food composition, the combined amounts of fumaric and acetic acid being effective to preserve the salad dressing against microbiological spoilage.

6. A salad dressing according to claim 5, further comprising a chemical preservative.

7. A salad dressing comprising about 50 percent by weight edible oil, about 33 percent moisture, about 2 percent by weight egg yolk, about 2 percent by weight nonfat milk solids, about 8 percent by weight sweetener, calculated as sucrose, about 1.5 percent by weight salt, about 0.75 percent by weight gum, about 0.1 percent emulsifiers, about 2.0 percent by weight spices and flavors, about 1.10 percent by weight acetic acid, based on total moisture content of the food composition, and about 1.3 percent by weight fumaric acid, based on moisture.

8. A salad dressing comprising about 15 percent by weight edible oil, about 67 percent by weight moisture, about 10 percent by weight sweetener, calculated as sucrose, about 2 percent by weight salt, about 0.3 percent emulsifiers, about 1.5 percent by weight gum, about 2.5 percent by weight spices and flavors, about 0.9 percent by weight acetic acid, based on total moisture content of the food composition, and about 1.3 percent by weight fumaric acid, based on moisture.

9. A salad dressing comprising about 0.75 percent by weight edible oil, about 73 percent by weight moisture, about 15 percent by weight sweetener, calculated as sucrose, about 2 percent by weight salt, about 2.5 percent by weight gum, about 2 percent by weight food particulates, about 3.0 percent by weight spices and flavors, about 0.96 percent by weight acetic acid, based on total moisture content of the food composition, and about 1.4 percent by weight fumaric acid, based on moisture.

10. A salad dressing comprising about 31.9 percent by weight edible oil, about 52 percent moisture, about 0.9 percent by weight nonfat milk solids, about 5.7 percent by weight sucrose, about 2.9 percent by weight salt, about 1.9 percent by weight dehydrated sour cream, about 1.3 percent by weight gum, about 1.0 percent by weight spices and flavors, about 0.96 percent by weight acetic acid, based on total moisture content of the food composition and about 0.47 percent by weight fumaric acid, based on moisture.

11. A salad dressing comprising about 31.9 percent by weight edible oil, about 51.6 percent by weight moisture, about 0.9 percent by weight nonfat milk solids, about 5.7 percent by weight sucrose, about 2.9 percent by weight salt, about 1.9 percent dehydrated sour cream, about 1.3 percent by weight gum, about 0.3 percent by weight emulsifier, about 0.009 percent by weight flavor preservative, about 1.3 percent by weight flavor enhancer, about 1 percent by weight spices and flavors, about 0.97 percent by weight acetic acid, based on total moisture content of the food composition, about 1.41 percent by weight fumaric acid, based on moisture.

12. A salad dressing comprising about 31.9 percent by weight edible oil, about 51 percent moisture, about 1.9 percent dehydrated sourcream, about 0.9 percent by weight nonfat dry milk solids, about 5.7 percent by weight sucrose, about 2.9 percent by weight salt, about 1.3 percent by weight hydrolyzed yeast, about 1.3 percent by weight gum, about 1.0 percent by weight spices and flavors, about 0.3 percent by weight emulsifiers, about 0.009 percent by weight EDTA, about 0.98 percent by weight acetic acid based on total moisture content of the food composition and about 2.85 percent by weight fumaric acid based on total moisture content of the food composition.

13. A salad dressing comprising about 47 percent by weight edible oil, about 27.6 percent by weight moisture, about 10 percent by weight dehydrated sour cream, about 9 percent by weight buttermilk, about 2 percent buttermilk solids, about 4 percent by weight sucrose, about 1 percent by weight salt, about 2 percent food particulates, about 0.3 percent by weight gum, about 2 percent by weight nonfat dry milk solids, about 0.1 percent by weight spices and flavors, about 0.2 percent by weight emulsifier, about 0.007 percent EDTA, about 0.9 percent by weight lactic acid, about 0.1 percent sodium benzoate, about 0.2 percent by weight potassium sorbate, about 1.31 percent by weight acetic acid, based on total moisture content of the food composition about 0.32 percent by weight fumaric acid, based on total moisture content of the food composition.

14. A salad dressing comprising about 39 percent by weight edible oil, about 31 percent moisture, about 3 percent by weight buttermilk solids, about 0.9 percent by weight food particulates, about 4 percent by weight sucrose, about 2 percent by weight salt, about 2 percent by weight nonfat dry milk solids, about 15 percent by weight dehydrated sour cream, about 13 percent by weight buttermilk, about 0.4 percent by weight gums, about 0.2 percent by weight emulsifier, about 0.8 percent by weight lactic acid, about 0.007 percent by weight EDTA, about 0.1 percent by weight spices and flavors, about 0.1 percent sodium benzoate, about 0.2 percent by weight potassium sorbate, about 1.31 percent by weight acetic acid, based on total moisture content of the food composition and about 0.32 percent by weight fumaric acid, based on total moisture content of the food composition.

15. A salad dressing comprising about 50 percent by weight edible oil, about 21.5 percent by weight moisture, about 12 percent by weight buttermilk, about 2 percent by weight buttermilk solids, about 2.0 percent by weight nonfat dry milk solids, about 4 percent by weight sucrose, about 2 percent by weight salt, about 0.007 percent by weight EDTA, about 15 percent dehydrated sour cream, about 0.25 percent by weight gums, about 0.2 percent by weight emulsifier, about 0.37 percent by weight spices and flavors, about 1.0 percent by weight lactic acid, about 0.2 percent by weight food particulates, about 0.1 percent by weight sodium benzoate, about 0.1 percent by weight potassium sorbate, about 1.42 percent by weight acetic acid, based on total moisture content of the food composition and about 0.47 percent by weight fumaric acid, based on total moisture content of the food composition.

16. A salad dressing comprising about 39 percent by weight edible oil, about 31.7 percent by weight moisture, about 14.5 percent by weight buttermilk, about 2.5 percent by weight buttermilk solids, about 4 percent by weight sucrose, about 2 percent by weight salt, about 15 percent dehydrated sour cream, about 0.35 percent by weight gums, about 0.2 percent by weight emulsifier, about 0.3 percent by weight spices and flavors, about 0.8 percent by weight lactic acid, about 2.0 percent by weight nonfat dry milk solids, about 0.007 percent by weight EDTA, about 0.1 percent by weight sodium benzoate, about 0.1 percent by weight potassium sorbate, about 1.25 percent by weight acetic acid, based on total moisture content of the food composition and about 0.32 percent by weight fumaric acid, based on total moisture content of the food composition.

17. In a method of preserving a salad dressing comprising about 32 percent by weight edible oil, about 51.6 percent by weight moisture, about 5.7 percent by weight sucrose and minor amounts of salad dressing ingredients, the step of providing for the presence therein of about 0.97 percent acetic acid, and about 1.4 percent fumaric acid, said percentages being weight based on the total moisture content of the salad dressing.

* * * * *